United States Patent [19]
Urbish et al.

[11] Patent Number: 5,565,756
[45] Date of Patent: Oct. 15, 1996

[54] MICROPROCESSOR CONTROLLED PORTABLE BATTERY CHARGER AND METHOD OF CHARGING USING SAME

[75] Inventors: Glenn F. Urbish, Coral Springs; Gerald W. Blanton, Lighthouse Point; Robert W. McGinnis, Plantation; Dale W. Dorinski, Coral Springs, all of Fla.

[73] Assignee: Motorola, Inc., Schaumburg, Ill.

[21] Appl. No.: 272,474

[22] Filed: Jul. 11, 1994

[51] Int. Cl.⁶ .......................... H01M 10/44; H01M 10/46
[52] U.S. Cl. .................... 320/15; 320/5; 320/6; 320/17
[58] Field of Search .................. 320/15, 16, 17, 320/18, 5, 6

[56] References Cited

U.S. PATENT DOCUMENTS

| | | | |
|---|---|---|---|
| 4,006,396 | 2/1977 | Bogut | 320/2 |
| 4,356,481 | 10/1982 | Kuki | 340/636 |
| 4,710,693 | 12/1987 | Wigell | 320/2 |
| 4,814,631 | 3/1989 | Jackson | 307/53 |
| 4,965,738 | 10/1990 | Bauer et al. | 364/483 |
| 5,019,767 | 5/1991 | Shirai et al. | 320/2 |
| 5,083,076 | 1/1992 | Scott | 320/2 |
| 5,121,046 | 6/1992 | McCullough | 320/16 |
| 5,200,686 | 4/1993 | Lee | 320/2 |
| 5,357,185 | 10/1994 | Chen | 320/2 |
| 5,469,043 | 11/1995 | Cherng et al. | 320/31 |

FOREIGN PATENT DOCUMENTS

| | | | |
|---|---|---|---|
| 62-173901 | 7/1987 | Japan | 320/15 |
| 4-248330 | 9/1992 | Japan | 320/15 |

OTHER PUBLICATIONS

*Battery Technology*, 1994, SlimPack for Macintosh Power-Book™ & Duo™ advertisement.

*Primary Examiner*—Robert Nappi
*Attorney, Agent, or Firm*—Dale W. Dorinski

[57] ABSTRACT

A portable battery charger (102) for use with a variety of battery packs (106) is capable of determining and applying the appropriate charge voltage and current. Electronic circuitry (128) within the portable battery charger identifies the type of battery pack to be charged and selects the appropriate set of battery banks (120) in the charger. Sensors (132) determine the state of charge of the battery pack and a controller (128) controls the functions of the charger. A multiplicity of connectors (314) on the portable battery charger are provided to allow connection to a variety of battery packs. The charger first identifies the type of battery pack and determines the charging profile to be used to charge the battery pack. The charging profile is set in the portable charger by selecting the appropriate sources of electrical power, and the battery pack is then appropriately charged.

27 Claims, 3 Drawing Sheets

MICROPROCESSOR CONTROLLED PORTABLE BATTERY CHARGER AND METHOD OF CHARGING USING SAME

TECHNICAL FIELD

This invention relates in general to battery chargers and more particularly to a charger for use with a variety of battery packages, each having different voltages and cell chemistries.

Many pieces of electronic equipment in the industrial and consumer market now utilize batteries for the power supply. The portability provided by batteries has made small consumer electronics extremely popular. Many people routinely carry or use cellular telephones, compact disk players, portable AM/FM radios, lap-top computers, camcorders, tape recorders, etc. Although the electronics or working portions of each of these devices continues to become smaller, lighter and thinner, they each require some sort of a battery or power supply. One unfortunate consequence of the small size and portability provided by battery-powered devices is the finite life of the battery. The advantages gained by being free from an electrical cord that must be plugged into an outlet are sometimes offset by the limited power capacity of batteries. Many or most of these devices use secondary or rechargeable type batteries. Secondary batteries, while having the advantage of being able to be recharged over and over again, have the disadvantage of a smaller capacity than primary batteries, and they are more expensive than primary batteries. The result of these limitations is that from time to time, the batteries used to power the electronic devices must be recharged by the user. Unfortunately, there is a wide variety of battery types and configurations in use today and no standardization exists for charging methods or schemes. Each type of device and each manufacturer of the device has a unique battery configuration that requires a unique battery charger; hence, the individual carrying more than one portable electronic device must also carry a multiplicity of chargers—one for each of the devices—in their travels. The need to carry additional chargers along with their accompanying wires, plugs, sockets, and transformers tends to negate the advantages gained by reductions in size of the electronics portion. For example, a person carrying a cellular phone, a lap-top computer and a camcorder would need to carry a specific battery charger for each of the three items, making their briefcase cumbersome, bulky and heavy.

Clearly, a need exists in the industry for an alternative method of charging a variety of secondary battery packs. This alternative should ideally be portable and universally adaptable to a wide variety of battery packs.

SUMMARY OF THE INVENTION

Briefly, according to the invention, there is provided a portable battery-charging system for use with a variety of battery packs which is capable of determining and applying the appropriate charge voltage and current. Electronic circuitry within the portable battery-charging system identifies the type of battery pack to be charged and selects the appropriate set of battery banks in the charger. Sensors determine the state of charge of the battery pack and a controller controls the functions of the charger.

In one embodiment of the invention, a multiplicity of connector types on the portable battery charging system are provided to allow connection to a variety of battery packs.

In still another embodiment of the invention, a method of charging a battery pack first identifies the type of battery pack and determines the charging profile to be used to charge the battery pack. The charging profile is set in the portable charger by selecting the appropriate sources of electrical power, and the battery pack is then appropriately charged.

DETAILED DESCRIPTION OF THE PREFERRED EMBODIMENT

It is common for battery packs which are used in portable communication devices, such as two-way radios, to have some sort of identification means built into the battery pack. For example, U.S. Pat. Nos. 5,164,652 and 5,200,686, both assigned to Motorola, Inc. and incorporated herein by reference, disclose the use of a resistor to identify the type of battery pack being charged. The resistor is typically used by a charger to determine the capacity of the battery, prior to the battery being charged, and optionally, a thermistor is used to determine if the battery is being charged properly.

Figure 1:
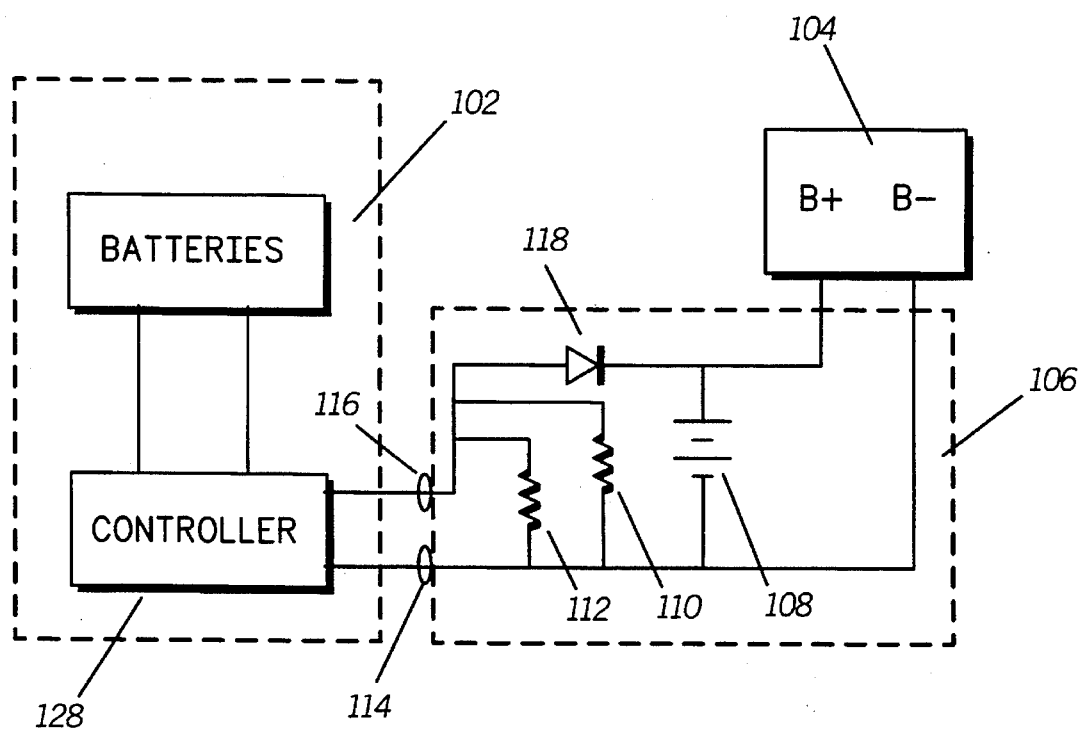
FIG. 1 is a schematic representation of an electronic device powered by a battery pack, the pack being charged by the portable battery charger in accordance with the invention.

While the specification concludes with claims defining the features of the invention that are regarded as novel, it is believed that the invention will be better understood from a consideration of the following description in conjunction with the drawing figures, in which like reference numerals are carried forward. Referring now to FIG. 1, there is shown a battery charging system consisting of a charger 102, battery pack 106 and an electronic device 104, such as a radio. The device 104 typically contains a connecting system consisting of at least positive (B+) and negative (B−) terminals which are coupled to the battery pack 106. Battery pack 106 typically contains one or more battery cells 108, which determine the voltage and current capacity of the battery pack. In the context of this invention, the term "battery", "cell" or "battery cell" is used to denote a single battery cell. Battery cells typically have an inherent voltage that is a function of the chemistry used in the battery cell. For example, nickel-cadmium (NiCd) batteries have a nominal voltage of 1.2 volts, whereas lithium batteries have nominal voltages of 3.6 volts, alkaline batteries have voltages of 1.5 volts, and so forth. On the other hand, a "battery pack" or "battery package" connotes a multiplicity of battery cells connected together and optionally packaged in a housing. These terms are in keeping with the generally accepted industry nomenclature. Battery packs containing a multiplicity of individual battery cells can have output voltages that are multiples of these numbers by appropriately connecting the batteries in series and/or in parallel as is well known in the art. A protection diode 118, a battery temperature indicator 112 (such as thermistor) and/or a battery capacity indicator 110, (such as resistor) are optionally found in some battery packs. The battery pack 106 typically contains other connections to recharge the battery cells. The connecting system can be individual battery contacts (116, 114), or it may be a plug having two or more electrical contacts, such as a standard DC power jack or a telephone-type jack.

Figure 2:
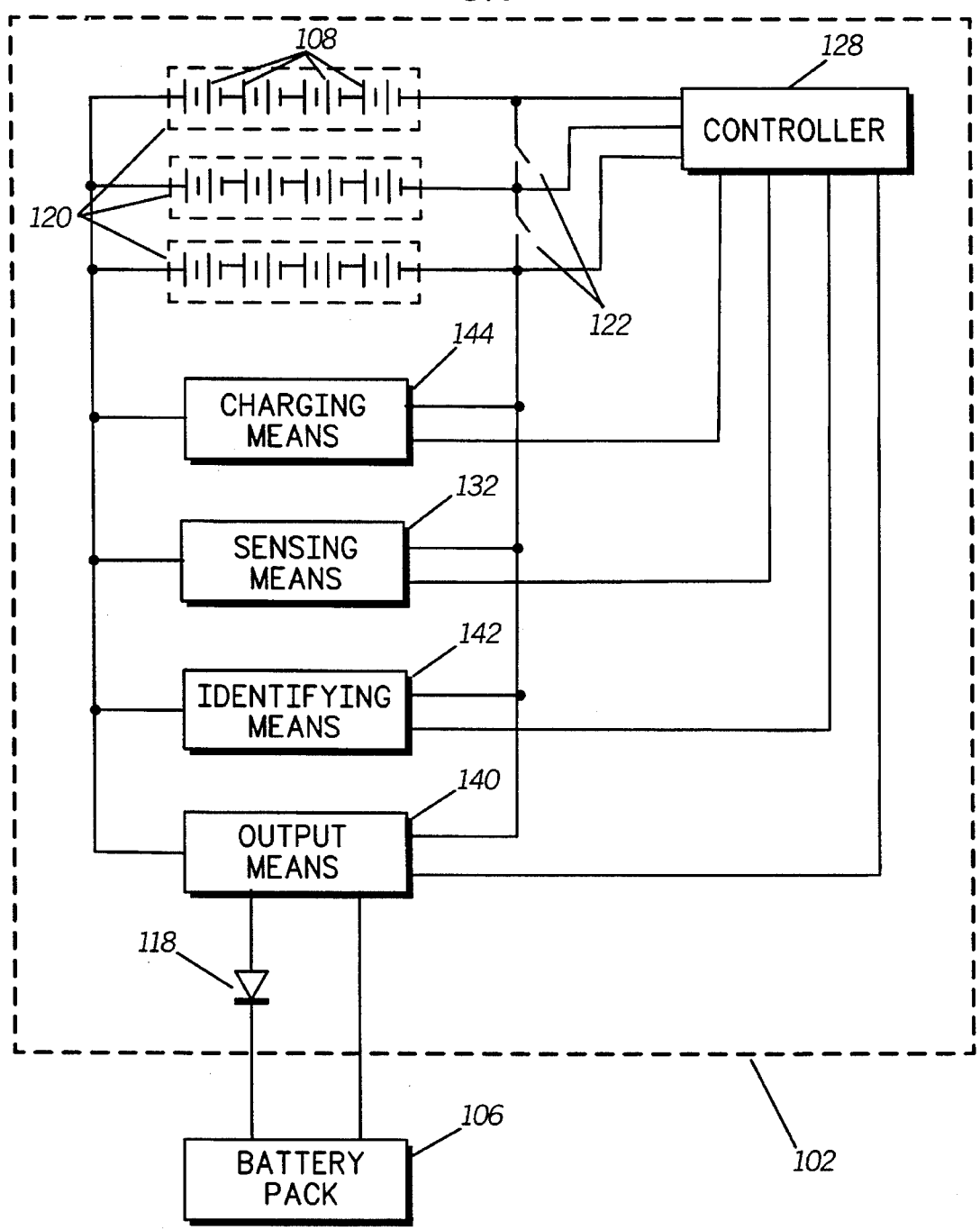
FIG. 2 is a schematic representation of one embodiment of the portable battery charger in accordance with the invention.

The charger 102 is a portable battery-charging system capable of simultaneously charging a multiplicity of battery pack types, for example, those used for a cellular phone, a lap-top computer, a fax modem, a two-way portable radio, and so forth. Charger 102 contains a controller 128, a plurality of battery cells, and other circuitry. FIG. 2 shows the various parts of the portable battery charger in more detail. The charger is controlled by a controller 128 which can consist of a microprocessor or microcontroller as is known in the art, along with appropriate control software. The controller 128 controls a charger control circuit which provides current to the battery pack 106 in order to charge it. The charger control circuitry contains a selection means 122 which selects one or more battery banks 120 from among a plurality of battery banks. By appropriately activating the selection means 120, which can consist of switches, various levels of voltage and power can be established to be delivered to the output of the charger. Each of the battery banks 120 contains a plurality of battery cells 108 that are electrically connected together. The cells are connected in series and/or parallel, to provide various voltage and ampere capacities. Preferably, each of the battery cells is a rechargeable NiCd cell with a voltage of 1.2 volts. Non-rechargeable primary batteries, such as alkaline and other similar types, can also be utilized with the present invention but are not preferred due to the fact that they can not be recharged. The charger 102 contains one or more output means 140 which connect the charger to the battery pack 106. The output means 140 typically is a connector or adapter that connects to the unique contact scheme of the battery pack 106. Many pieces of electronic equipment have a jack labeled "DC" that can be directly connected to the portable battery charger. Others have individual sets of contacts that can be connected to the charger, and still others have a unique plug containing several contacts that is used to charge the battery. In the preferred embodiment, one version of the output means is an industry-standard jack configuration, such as a mini-phone jack. Other versions of the output means may consist of adapters configured for the popular electronic items. For example, one output jack may be configured to connect to a cellular telephone. Another one may be for a laptop computer, and so forth.

An identifying means 142 connected to the controller 128 serves to identify the type of battery pack being charged. The ability to identify the type of battery that is to be charged by the portable charger is important, because the charging profile and parameters are different for each of the chemistries that are used in the battery packs. There are yet unknown or untried battery chemistries, and the charger should have forward compatibility. There are several ways, or combinations of ways, to do this. For example, in some battery packs, a coding resistor connected to the negative terminal of the pack is used to inform the battery charger of the capacity of battery. The value of the resistor is arbitrarily selected to indicate the capacity to the charger so that the charger can send the appropriate magnitude of charging current to the battery. For example, assigning a value of 1000 ohms to the coding resistor would indicate to the charger that the battery exhibits a capacity of 1000 mAh (milli-amphours). The battery charger, upon determining the battery capacity, can select the proper charging rate to use to optimally charge the battery. Another way to identify battery cells is to electrically determine the chemical characteristics of the cell. This can be accomplished by measuring the voltage, internal impedance, internal capacitance, power sag (dV/dI), or other characteristics. These measurements can be correlated or complemented with information as to the basic capacity (size) of the battery pack, since characteristics such as impedance and power capability are a strong function of the size of the pack. Depending on the scheme chosen, more than one characteristic might be measured. Examples of suitable measurement criteria are:

(a) Voltage. The Voc for nickel systems (NiCd, NiMh) will be a multiple of the nominal cell voltage of 1.3 Volts. For lithium systems the voltages will be multiples of the nominal cell voltage of 3.6 Volts.

(b) Impedance. The internal impedance (measured with small signal methods) differences between the two nickel systems (NiCd, NiMh) and the lithium systems is detectable and can be used to identify the battery pack characteristics if the battery cell size is known. Software driven algorithms resident in the controller use this data to determine the charging scheme. The algorithms can also be used to identify new battery pack sizes.

(c) Capacitance. The capacitive characteristics of the various cell chemistries are different, and also provide unique, identifying characteristics. Again in this case the cell size would have to be known.

(d) Capacity. High current performance differs among the various cell chemistries. This method can be also be used to differentiate between technologies.

Another method of identifying the battery pack type is by it's physical characteristics. Since each product has a unique electrical/mechanical plug or connector, this also provides information that can be used to signal (for example, by means of internal electrical connection scheme) the portable charger and identify the type of battery pack. Many of today's newer technology batteries are maintaining charger compatibility with the older technology by means of "smart" components of the battery that convert it back to NiCd-type charging characteristics. Thus, algorithms in the controller can make this system compatible with many battery chemistries. Further, a selectable switch or keyboard input to the microprocessor in the charger provides another means of manually or automatically identifying the battery type. All battery packs contain some type of safety or environmental labeling which can aid the user in determining the charging profile to be selected. For example, if a battery pack label designated the pack as being "NiCd, 3200 mAh" this information would be entered by the user into the portable charger to select the appropriate charging scheme. Other versions may have one method as the primary system with another as the backup.

A sensing means 132 provides information to the controller 128 on the state of charge of the battery banks 120, and on the state of charge of the battery pack being charged. The sensing means 132 allows for proper selection among the individual battery banks 120. For example, some banks might be temporarily discharged and thus unsuitable for immediate use in charging a battery pack. The sensing means 132 provides status information to the controller 128, and the controller then selects the appropriate battery banks. Some banks might be configured to provide higher voltages than others, and would be used for example, to charge lithium battery cells rather than NiCd cells. The sensing means 132 also provides information to the controller on the state of charge of the battery pack being charged. When the battery charger 102 is coupled to the battery pack 106, it must make a determination of when it is appropriate to discontinue charging. In some battery packs, a thermistor coupled to the negative battery terminal (ground) provides this signal. As battery charging progresses, the temperature of the battery rises until it reaches a temperature at which charging is complete. To proceed higher than this temperature would indicate that the battery is overcharged perhaps resulting in substantial battery damage. To prevent such overcharging, the charger senses the resistance of the thermistor, and thus determine the temperature of the battery. When the charger determines that a battery temperature is reached which indicates that the battery is fully charged, then charging is discontinued. Other means of determining the end of charge are by measuring the voltage levels (as in the well-known ΔV, ΔT or δT/δt measurements used with NiCd cells) or simple measurement of the time of charge.

The connection of the charger 102 to the battery pack 106 allows the battery pack to receive electrical energy (current) and be recharged. Preferably, the total output voltage of the charger should be at least 1.25 volts greater than the voltage of the battery pack. For example, if the battery pack contains 7.5 volt NiCd rechargeable batteries, then the charger should have a voltage of at least 8.75 volts. This would allow for current (electrical energy) to flow from the charger to the battery pack. This voltage differential allows the battery pack to receive the electrical energy found in the charger, since the charger is at a slightly higher voltage potential, the current flows to the battery pack. The difference of voltage between the two devices is monitored and controlled by a sensing means 132. Discharging of current from the battery pack 106 into charger 102 could occur in the situation where the battery pack would be at a higher voltage potential than the charger. A diode 118 prevents this and protects the battery pack and the charger against the connection of the positive and negative terminals in reverse polarity order.

In addition, the portable battery charger can itself be recharged since in one embodiment, it contains a plurality of rechargeable cells. A charging means 144 includes adapters for connection to external power sources. This may be accomplished, for example, by connection with a adapter cord to an automobile cigarette lighter. Additional contacts on the charger provide for connection to a wall outlet using 110 Volt AC power. During the charging phase, the sensing means 132 provides information to the controller 128 on the status of charge of the various battery banks 120 and the controller 128 activates the selection means 122 to select the banks to be charged.

Figure 3:
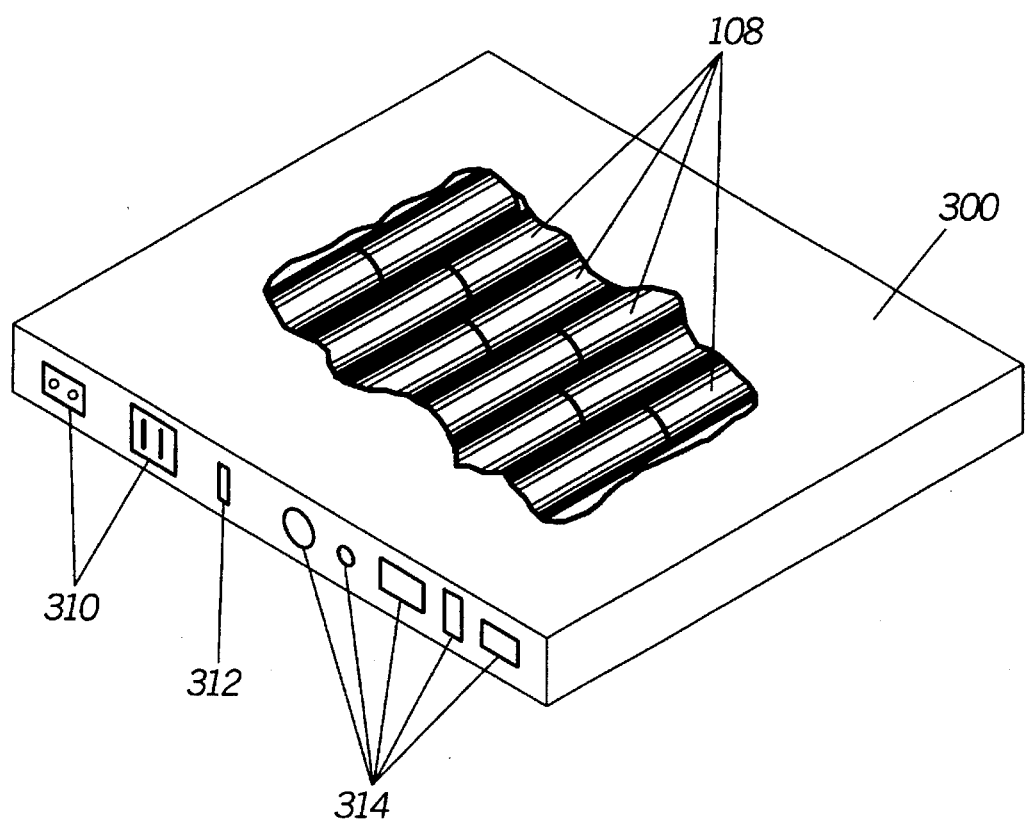
FIG. 3 is a partially cut-away isometric view of the portable battery charger in accordance with the invention.

Referring now to FIG. 3, the battery cells 108 are suitably disposed in a charger housing 300. The housing 300 contains the various plugs and adapters (a portion of the charging means 144) needed to accommodate the connections needed to power the charger during the charging phase. An "on-off" switch 312 provides the main system disconnect for the charger. Other adapters 314 (part of the output means 140) are provided on the back of the housing to receive the plugs and connections from the battery pack being charged.

One alternative embodiment of the invention replaces the battery banks with another power source, such as connecting the portable battery charger directly to a wall outlet (110 Volt AC) or a cigarette lighter plug (12–14 Volt DC) in a vehicle. While this embodiment does not have the advantage of being cordless, it has the additional advantage of being smaller and lighter, because the battery banks are eliminated, thereby creating a significant reduction in the size of the portable battery charger housing. Electronic circuitry in the portable charger provides a multiplicity of available voltages, and the selection means 122 chooses the appropriate voltage from the power source. The remainder of the charger functions are similar to those described in the previous embodiments.

It can be clearly seen that the instant invention provides a convenient way of charging a wide variety of battery pack types and configurations, and eliminates the need to carry numerous and bulky battery charging cords, connectors, and adapters. Depending on the size of the housing, the portable battery charger may have a power capacity of 20–80 ampere-hours or greater. This is enough to provide many cycles of charge to batteries such as laptop computers and camcorders. A single charger can be used to charge a multiplicity of battery packs, and the portability makes it an ideal candidate for use on travels. Many types of rechargeable battery packs can be used with the present invention. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charger for use in charging a variety of battery packs, comprising:

a plurality of battery banks electrically connected to each other, each bank comprising a plurality of battery cells;

selection means, coupled to the plurality of battery banks, for selecting one or more of the banks;

sensing means, coupled to the plurality of battery banks, for determining state of charge of the banks and the battery pack;

output means coupled to the battery banks;

means for identifying the electrical and chemical characteristics of the battery pack being charged, coupled to the output means; and a controller, coupled to the selection means, the sensing means, and the means for identifying, and responsive to the sensing means and the means for identifying.

2. The battery charger as described in claim 1, wherein the battery cells are secondary battery cells.

3. The battery charger as described in claim 2, further comprising a charging means coupled to the battery banks, for recharging the battery cells.

4. The battery charger as described in claim 2, wherein the output means comprises a plurality of adapters.

5. The battery charger as described in claim 1, wherein the sensing means determines state of charge of each individual bank.

6. The battery charger as described in claim 1, further comprising a charging means for charging the plurality of battery banks.

7. The battery charger as described in claim 6, wherein the charging means is coupled to the controller.

8. The battery charger as described in claim 1, wherein the means for identifying comprises measuring the voltage of the battery pack.

9. The battery charger as described in claim 1, wherein the means for identifying comprises one or more selectable settings.

10. The battery charger as described in claim 1, wherein the battery charger has a voltage of at least 1.25 volts greater than the battery pack.

11. A portable battery charger for use with a variety of battery pack types, comprising:

a plurality of rechargeable battery cells;

selection means, coupled to the plurality of battery cells, for selecting one or more of the plurality of battery cells;

a connecting means for electrically coupling the portable battery charger to a battery pack, the connecting means having a first set of contacts which couple the portable battery charger to the battery pack, and a second set of contacts which couple the portable battery charger to an external source of power to recharge the plurality of battery cells;

means for identifying the electrical and chemical characteristics of the battery pack being charged, coupled to the connecting means;

a controller coupled to the selection means, to the plurality of battery cells, to the connecting means and to the means for identifying, and responsive to the means for identifying;

the portable battery charger having a greater voltage potential than the battery pack being charged.

12. The portable battery charger in accordance with claim 11, wherein the portable battery charger has a voltage of at least 1.25 volts greater than the battery pack.

13. A method for charging a battery pack using a portable charger, comprising the steps of:

a) connecting the battery pack to a portable charger, the portable charger comprising;

a power source having the capability of providing a plurality of voltage and current outputs, comprising a plurality of rechargeable battery cells;

means for connecting the portable battery charger to a battery pack to be charged, comprising one or more connectors specifically adapted to interconnect to battery powered electronic devices;

means for identifying the battery pack to be charged;

sensing means, coupled to the power source and to the means for connecting, for determining the state of charge of the power source and the battery pack;

selection means, responsive to a microprocessor, for selecting a desired voltage and current output from the power source; and the microprocessor coupled to the power source, the means for identifying, the sensing means and the selection means, and the microprocessor responsive to the means for identifying and the sensing means;

b) identifying the battery pack and determining the state of charge of the battery pack by electrically measuring the battery pack;

c) communicating the information from step (b) to the microprocessor;

d) selecting a charging regime to be used to charge the battery pack from among those stored in the microprocessor, based on the information communicated in step (c);

e) selecting appropriate electrical output from the power source based on the selected charging regime;

f) charging the battery pack in accordance with the selected charging regime;

g) monitoring the battery pack during the step of charging; and h) steps (b) through (g) performed by the microprocessor.

14. A method as defined in claim 13, wherein the step of identifying comprises determining the resistance of a device in the battery pack.

15. A method as defined in claim 13, wherein the step of monitoring comprises determining the resistance of a temperature varying device in the battery pack.

16. A method as defined in claim 13, comprising an additional step between steps (g) and (h) of monitoring the battery pack after the step of charging.

17. A battery charger for use in charging a variety of battery packs, comprising:

a power source having a plurality of voltage levels;

selection means, coupled to the power source and responsive to a controller, for selecting one of the plurality of voltage levels;

sensing means, coupled to the power source, for determining state of charge of the battery pack;

output means coupled to the power source;

means for identifying the electrical and chemical characteristics of the battery pack being charged, coupled to the output means; and the controller coupled to the selection means, to the sensing means, and to the means for identifying, and responsive to the sensing means and the means for identifying.

18. A method as described in claim 13, wherein steps (b) through (g) are performed without manual intervention.

19. A portable battery charger for charging a variety of battery pack types, comprising:

a power source having the capability of providing a plurality of voltage and current outputs, comprising a plurality of rechargeable battery cells;

means for connecting the portable battery charger to a battery pack to be charged, comprising one or more connectors specifically adapted to interconnect to battery powered electronic devices selected from the group consisting of a cellular telephone, a lap-top computer, a fax modem, a two-way portable radio, a camcorder, a tape recorder, and a compact disk player;

means for identifying the state of charge and the identity of the battery pack to be charged;

sensing means, coupled to the power source and to the means for connecting, for determining the state of charge of the power source and the battery pack;

selection means, responsive to a microprocessor controller, for selecting a desired voltage and current output from the power source; and the microprocessor controller coupled to the power source, the means for identifying, the sensing means and the selection means, and the microprocessor controller responsive to the means for identifying and the sensing means, and the microprocessor controller controlling the charging regime between the portable battery charger and the battery pack.

20. The portable battery charger as described in claim 19, further comprising a set of contacts to couple the portable battery charger to an external source of power to recharge the power source.

21. The portable battery charger as described in claim 19, wherein the plurality of rechargeable battery cells are nickel-cadmium cells.

22. The portable battery charger as described in claim 19, wherein the means for connecting further comprises a standard DC power jack.

23. The portable battery charger as described in claim 19, wherein the means for identifying comprises measuring the voltage of the battery pack.

24. The portable battery charger as described in claim 19, wherein the means for identifying comprises measuring the voltage and the impedance of the battery pack.

25. The portable battery charger as described in claim 19, wherein the means for identifying comprises sensing a coding resistor in the battery pack.

26. A portable battery charger for charging a variety of battery pack types, comprising:

a power source having the capability of providing a plurality of voltage and current outputs, comprising a plurality of rechargeable nickel-cadmium battery cells;

means for connecting the portable battery charger to a battery pack to be charged, comprising one or more connectors specifically adapted to interconnect to battery powered electronic devices selected from the group consisting of a cellular telephone, a lap-top computer, a fax modem, a two-way portable radio, a camcorder, a tape recorder, and a compact disk player;

means for identifying the identity of the battery pack to be charged, comprising measuring the voltage and impedance of the battery pack, or measuring the value of a resistor in the battery pack;

sensing means, coupled to the power source and to the means for connecting, for determining the state of charge of the power source and the battery pack;

selection means, responsive to a microprocessor, for selecting a desired voltage and current output from the power source;

the microprocessor coupled to the power source, the means for identifying, the sensing means and the selection means, and the microprocessor responsive to the means for identifying and the sensing means, and the microprocessor automatically controlling the charging regime between the portable battery charger and the battery pack; and a charging connector, coupled to the power source and the controller, for coupling thee portable battery charger to an external source of power to recharge the power source.

27. The portable battery charger as described in claim 26, wherein the means for identifying, the sensing means, and the selection means operate upon control from the microprocessor without manual intervention.

* * * * *